(12) United States Patent
Rouvala et al.

(10) Patent No.: US 9,357,596 B2
(45) Date of Patent: May 31, 2016

(54) DRIVERS FOR LOADS SUCH AS LIGHT EMITTING DIODES

(75) Inventors: Markku Antti Kyosti Rouvala, Helsinki (FI); Kai Kristian Jamsa, Lieto (FI); Samuli U. Wallius, Turku (FI)

(73) Assignee: Nokia Technologies Oy, Espoo (FI)

(*) Notice: Subject to any disclaimer, the term of this patent is extended or adjusted under 35 U.S.C. 154(b) by 644 days.

(21) Appl. No.: 13/173,610

(22) Filed: Jun. 30, 2011

(65) Prior Publication Data

US 2013/0002165 A1 Jan. 3, 2013

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01)

(58) Field of Classification Search
CPC .... H05B 33/0815; H05B 37/02; H05B 33/02; H05B 33/08; H05B 33/0806; H05B 33/0827; H05B 37/00; Y02B 20/346; Y02B 20/325
USPC .......... 315/294, 299, 291; 323/282; 327/111, 327/423
See application file for complete search history.

(56) References Cited

U.S. PATENT DOCUMENTS

| | | | |
|---|---|---|---|
| 4,485,311 A | 11/1984 | Goerne et al. | 307/270 |
| 5,231,563 A * | 7/1993 | Jitaru | 363/98 |
| 5,559,402 A * | 9/1996 | Corrigan, III | 315/169.3 |
| 6,087,863 A * | 7/2000 | Aflatouni | H05B 33/08 327/111 |
| 6,172,882 B1 | 1/2001 | Tanaka et al. | 363/17 |
| 8,169,156 B2 * | 5/2012 | Hsu et al. | 315/291 |
| 8,314,513 B2 * | 11/2012 | Aoyama et al. | 307/104 |
| 2001/0043113 A1 | 11/2001 | Hoshino et al. | 327/534 |
| 2002/0008499 A1 | 1/2002 | Henry | 323/267 |

(Continued)

FOREIGN PATENT DOCUMENTS

| | | |
|---|---|---|
| CN | 101036281 A | 9/2007 |
| CN | 101124714 A | 2/2008 |

(Continued)

OTHER PUBLICATIONS

"Power MOSFET", http://en.wikipedia.org/wiki/Power_MOSFET, Jun. 24, 2011, 10 pgs.

(Continued)

*Primary Examiner* — Tuyet Vo
*Assistant Examiner* — Henry Luong
(74) *Attorney, Agent, or Firm* — Harrington & Smith

(57) ABSTRACT

An apparatus is disclosed that includes a first node coupleable to a power supply, a charge storage component coupled between a second node and a third node, and a first leg between the first node and second node. The first leg includes a first switching device. The apparatus includes a second leg between the first node and the third node. The second leg includes a second switching device. The apparatus includes a third leg between the second node and a fourth node. The third leg includes a third switching device. The apparatus includes a fourth leg between the third node and the fourth node, wherein the fourth leg includes a fourth switching device. The apparatus includes one or more contacts in one of the second leg or the third leg, the one or more contacts configured to be coupled to a load. Charging and load driving operations may be performed.

15 Claims, 7 Drawing Sheets

(56) References Cited

U.S. PATENT DOCUMENTS

| | | | |
|---|---|---|---|
| 2004/0178747 A1* | 9/2004 | Jones et al. | 315/291 |
| 2005/0248216 A1 | 11/2005 | Cassel | 307/106 |
| 2006/0145968 A1 | 7/2006 | You et al. | 345/76 |
| 2006/0197722 A1* | 9/2006 | Nakajima | 345/83 |
| 2008/0088179 A1 | 4/2008 | Oyama et al. | 307/28 |
| 2008/0094042 A1 | 4/2008 | Ferrario | 323/234 |
| 2008/0205088 A1* | 8/2008 | Chung et al. | 363/17 |
| 2009/0160367 A1 | 6/2009 | Imanaka | 315/307 |
| 2011/0068700 A1 | 3/2011 | Fan | 315/185 R |

FOREIGN PATENT DOCUMENTS

| | | |
|---|---|---|
| EP | 2128848 A1 | 12/2009 |
| JP | 6284749 A | 10/1994 |
| JP | 2000-324851 A | 11/2000 |
| WO | WO 2010118978 A2 * | 10/2010 |

OTHER PUBLICATIONS

International Search Report for International Patent Application No. PCT/FI2012/050499 mailed Jul. 11, 2012.

* cited by examiner

| Operation | Processor control of switching devices | | | |
|---|---|---|---|---|
| | Active (closed) | | Inactive (open) | |
| Charge | A (21) | D (22) | B (23) | C (24) |
| Load (e.g., flash) driving (Discharge) | B (23) | C (24) | A (21) | D (22) |

FIG. 3B

DRIVERS FOR LOADS SUCH AS LIGHT EMITTING DIODES

TECHNICAL FIELD

The present application relates generally to power management in electronic devices, more specifically to drivers for driving loads such as high current, short duration electronic devices like Light Emitting Diodes (LEDs).

BACKGROUND

Mobile devices, such as cameras and mobile phones, are powered by batteries having limited energy and power. Eighty percent of current mobile phones have a built-in camera and flash and this number is expected to increase. The flash is used to provide light in dark and low-light ambient lighting situations. Modern camera algorithms are intelligently handling ambient lighting situations so that ambient light is used as background light in addition to the possibly needed extra light provided from flashes. The flashes are typically implemented by power LEDs (PLEDs) or xenon flashes. High current LEDs have lately been introduced for flashes in camera phones. LEDs are expected to approach the power levels of xenon in the near future and may replace built-in xenon flashes in many cameras. The major advantages of LEDs over xenon include low voltage operation, higher efficiency, and extreme miniaturization. In addition to the major advantages, an LED can produce continuous light (called "torch mode") for a relatively long period, which is not possible for the xenon flash.

LEDs are current controlled devices, meaning that the intensity of their light output is proportional to the current passing through them. They also have a maximum current rating that may not be exceeded, otherwise the LEDs can be damaged. To limit the amount of current through an LED, a current-limiting resistor is typically inserted in series with the LED. If an LED is connected so that it is emitting light, a so-called forward voltage drop across the LED usually varies from 1.5V (volts) up to 5V, depending on the power output of the LED. The forward voltage drop is important in that the drop defines the voltage necessary in order to drive the LED. For example, a 1.5V battery will not be able to drive an LED with a 2.5V forward voltage drop. The LED will simply not emit light at the 1.5V level. In comparison, the main alternative technology for a flash in cameras and camera phones, the xenon flash, is a high voltage device, powered by high voltage instead of high current.

Drivers or charge storage devices are needed to drive LEDs or to source the peak power to flash LEDs. LEDs should only be connected directly to constant-voltage sources. Switched-mode power supplies (SMPSs) such as boost converters are used in some LED flashlights, stabilizing light output over a wide range of battery voltages and increasing the useful life of the batteries. SMPSs contain networks of energy storage inductors and capacitors and power handling electronic switches and rectifiers. A boost converter is a step-up DC (direct current) to DC converter with an output DC voltage greater than the input DC voltage. A charge pump can be also used to boost up the DC voltage but an extra charge balancing circuit may be needed. An LED has a positive and a negative terminal, also known as the anode and cathode. The cathode should be connected towards the ground or negative side of the driving voltage source, and the anode toward the positive side.

Although LEDs are proving to be useful for flashes, improvements in drivers for the LEDs could still occur.

SUMMARY

Various aspects of examples of the invention are set out in the claims. This section is intended to be a non-limiting overview of exemplary embodiments.

In an exemplary embodiment, an apparatus is disclosed that includes a first node configured to be coupled to a power supply, a charge storage component coupled between a second node and a third node, and a first leg between the first node and second node. The first leg includes a first switching device. The apparatus includes a second leg between the first node and the third node. The second leg includes a second switching device. The apparatus includes a third leg between the second node and a fourth node. The third leg includes a third switching device. The apparatus includes a fourth leg between the third node and the fourth node, wherein the fourth leg includes a fourth switching device. The apparatus includes one or more contacts in one of the second leg or the third leg, the one or more contacts configured to be coupled to a load. Closing the first and fourth switching devices and opening the second and third switching devices cause the charge storage component to be charged via the first and fourth legs by the power supply. Closing the second and third switching devices and opening the first and fourth switching devices cause the load to be driven via the second and third legs by the power supply and the charge storage component.

In another exemplary embodiment, an apparatus includes one or more processors and one or more memories including computer program code. The one or more memories and the computer program code are configured to, with the one or more processors, cause the apparatus to perform at least the following: charging a charge storage component by causing a first switching device and a fourth switching device to be closed and by causing a second switching device and a third switching device to be opened in a load driver circuit. The load driver circuit includes a first node coupled to a power supply. The load driver circuit includes a charge storage component coupled between a second node and a third node, and a first leg between the first node and second node. The first leg includes a first switching device. The load driver circuit includes a second leg between the first node and the third node. The second leg includes a second switching device. The load driver circuit includes a third leg between the second node and a fourth node. The third leg includes a third switching device. The load driver circuit includes a fourth leg between the third node and the fourth node, wherein the fourth leg includes a fourth switching device. The load driver circuit includes one or more contacts in one of the second leg or the third leg, the one or more contacts configured to be coupled to a load. The one or more memories and the computer program code are additionally configured to, with the one or more processors, cause the apparatus to perform at least the following: driving the load by causing the second and third switching devices to be closed and by causing the first and fourth switching devices to be opened.

In yet another exemplary embodiment, a computer program product is disclosed that includes a computer-readable medium bearing computer program code embodied therein for use with a computer. The computer program code includes code for charging a charge storage component by causing a first switching device and a fourth switching device to be closed and by causing a second switching device and a third switching device to be opened in a load driver circuit. The load driver circuit includes a first node coupled to a power supply. The load driver circuit includes a charge storage component coupled between a second node and a third node, and a first leg between the first node and second node. The first leg includes a first switching device. The load driver circuit includes a second leg between the first node and the third node. The second leg includes a second switching device. The load driver circuit includes a third leg between the second node and a fourth node. The third leg includes a third switching device. The load driver circuit includes a fourth leg between the third node and the fourth node, wherein the fourth leg includes a fourth switching device. The load driver circuit includes one or more contacts in one of the second leg or the third leg, the one or more contacts configured to be coupled to a load. The computer program code includes code for driving the load by causing the second and third switching devices to be closed and by causing the first and fourth switching devices to be opened.

BRIEF DESCRIPTION OF THE DRAWINGS

For a more complete understanding of example embodiments of the present invention, reference is now made to the following descriptions taken in connection with the accompanying drawings in which:

FIG. 3B is a table indicating how a processor would configure the switching devices in FIG. 3A in order to perform certain operations, in accordance with an exemplary embodiment of the instant invention;

DETAILED DESCRIPTION OF THE DRAWINGS

An example embodiment of the present invention and its potential advantages are understood by referring to the figures of the drawings.

Figure 1:
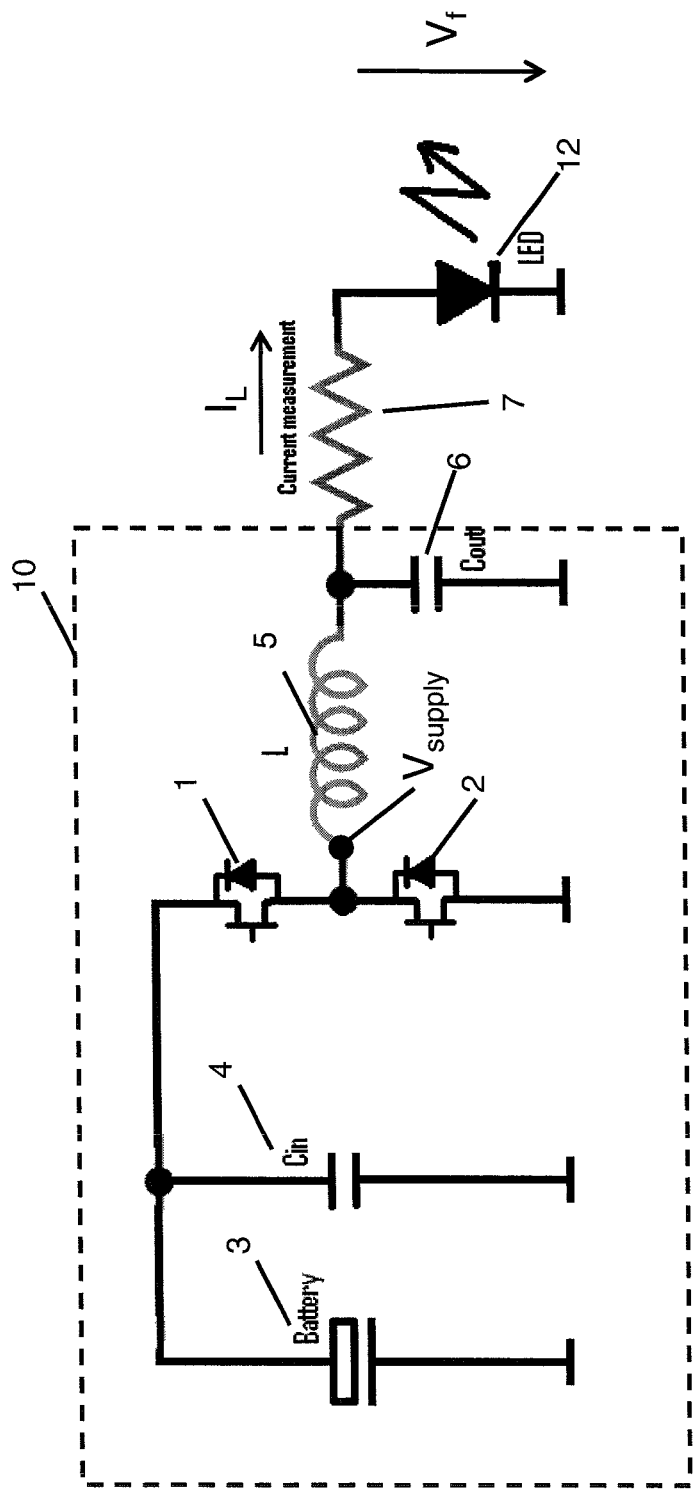
FIG. 1 illustrates a basic buck converter as an LED driver.

A buck converter is a type of DC-to-DC (direct current to direct current) switching regulator with an output DC voltage lower than the input DC voltage. A buck converter has relatively lower complexity than a boost converter. FIG. 1 shows an example of buck converter 10 driving an LED load 12. This exemplary buck converter 10 comprises two transistors 1, 2, which operate as described as follows for charging and discharging. When the buck converter 10 is in charge mode of operation, top transistor 1 is open (i.e., not conducting) and the battery 3 charges the input capacitor $C_{in}$ 4. When the buck converter 10 is in a discharge mode of operation, the bottom transistor 2 is open and the top transistor 1 is closed (i.e., conducting), so that the current is fed to the LED load 12 through the inductor L 5 and the current measurement resistor R 7. The transistor 2 is part of a buck-synchronized rectifier. For the unsynchronized case, the transistor 2 may be replaced by a diode (the so called "free wheel diode"). The inductor L 5 stores energy during charge mode and tries to maintain the stored energy during discharge mode. The energy transmission rate is determined by the duty cycle of the transistors 1, 2. For a conversion operation in steady state, the output voltage of the buck converter 10 $V_{supply}$ can be assumed constant during a charge-discharge commutation cycle. The output current delivered to the LED load 12 can be also assumed constant as long as the output capacitor $C_{out}$ 6 is large enough to maintain a constant voltage across its terminals during the charge-discharge commutation cycle. Each LED load 12 has a maximum permitted current. An LED current $I_L$ is always less than or to equal to the maximum permitted current. The resistor R 7 is also for limiting the current to a safe value, preventing the LED 12 from being destroyed by too much current from the power supply 10. The output capacitor $C_{out}$ 6 is for reducing the ripple and stabilizing the voltage. A buck converter 10 puts minimal stress on the switch (transistor 1) and requires a relatively small output filter for reducing output ripple.

In reality, both static and dynamic power losses occur in any switching regulator. Static power losses include losses in the wires, switches, and inductor while dynamic power losses occur because of switching during charging and discharging. When the SMPS driver is predetermined, the selection of the LED load 12 may be limited in a certain way as low power LEDs tend to have lower voltage drops, and high power LEDs have higher voltage drops. Likewise, blue or white LEDs tend to have higher voltage drops than, e.g., red LEDs. The output voltage of the buck converter 10 is always less than the battery voltage $V_{bat}$, and is proportional to the efficiency of power conversion which is always less than 1 (one). Thus, in an implementation of using a buck converter to drive an LED load, the battery voltage $V_{bat}$ must be always larger than forward voltage $V_f$ of the LED load 12 to meet a desired LED current $I_L$.

The recent development of supercapacitors has started a new circuit development for driver/charger circuits using a supercapacitor as an LED power source, with which the power can be much larger. This implies more lux (a unit of illuminance), for example, around twice as much by analysis. Supercapacitors are typically naturally maximum 2.7V tolerance devices. The term "supercapacitor" is a common name for a single-cell or a multi-cell charge storage component. A supercapacitor could be an electric dual layer capacitor (EDLC) or an electric single layer capacitor (ESLC). In an exemplary embodiment of the instant invention, only a single cell supercapacitor is used to handle the output voltage of the buck converter. Then the supercapacitor dimensions are the smallest possible. By contrast, in commonly used boost type devices, the output voltage is higher than $V_{bat}$, and a multi-cell supercapacitor is chosen to handle the $V_{out}$. The cells are connected in series in boost solution. This means two EDLC cells are generally used for LED flash drive applications, where forward voltage of power LEDs are in excess of 3.5V. This also entails another requirement for the driver control circuit, which is a balancing pin for balancing the two cells for equal voltage. Otherwise, current generated resistive heat will unbalance the voltages of the two EDLC cells. EDLC capacitance range is much higher compared to standard technologies like normally used electrolytic capacitors or tantalum capacitors. EDLCs range from several hundred millifarads to farads in small discrete solutions meant for portable devices, while electrolytic capacitors are in range of tens or hundreds of microfarads. The higher capacitance of EDLC delivers better performance for high current applications like flashes and speakers. Driver/charger circuits are, however, needed to provide charging for the capacitor, which is sourcing the peak power to the LEDs flash load.

Figure 2:
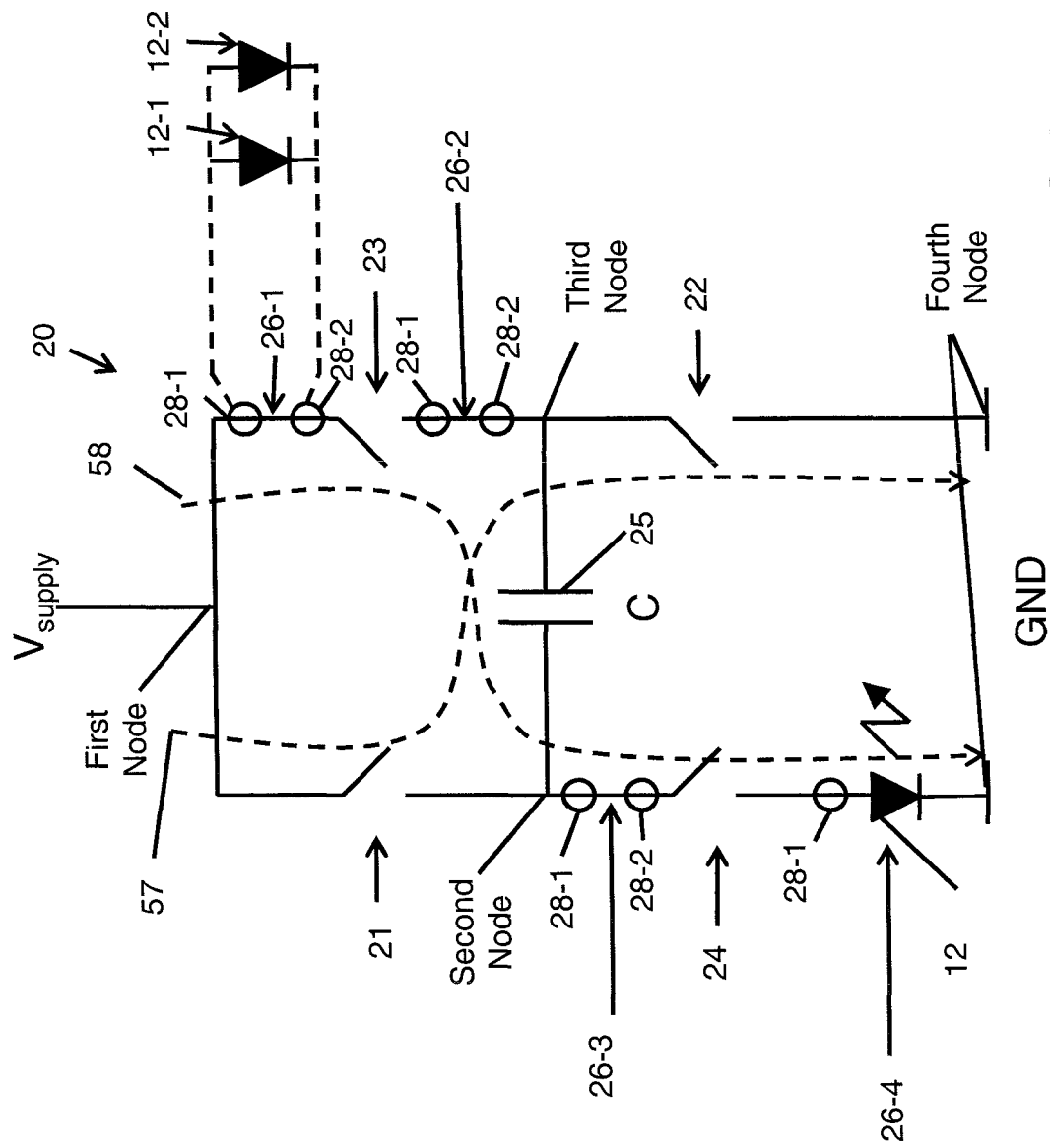
FIG. 2 shows a circuit for driving a load (e.g., LED flash) using a storage component according to an example embodiment of the invention.

FIG. 2 shows a circuit for driving a load (e.g., an LED flash) using a charge storage component according to an example embodiment of the invention. The load driver circuit 20 comprises a first pair of switching devices 21 and 22, a second pair of switching devices 23 and 24 and a charge storage device 25, which is in an exemplary embodiment an electric single layer capacitor and in another exemplary embodiment a supercapacitor. The four switching devices 21-24 may comprise diodes and transistors such as field-effect transistors (FETs), metal-oxide-semiconductor FETs (MOSFETs), bipolar junction transistors (BJTs), junction FET (JFET) or any other components that perform a switching function. Shown in the example of FIG. 3 (described below) are power MOSFETs. The charge storage device 25 (e.g., supercapacitor) is coupled between the first pair of switching devices 21, 22, which are further coupled to the power supply $V_{supply}$ and the ground (GND) respectively. The supercapacitor, as charge storage component 25, is also coupled between the second pair of switching devices 23, 24 which are further coupled to the power supply $V_{supply}$ and the load 12 (in this example, an LED flash).

According to an example embodiment, the supplied voltage $V_{supply}$ may be directly from a battery (not shown). According to another example embodiment, driver circuitry, for example an SMPS, provides assistance of the voltage fed to the LED flash load 12, when the charge storage device 25 is discharged to the point that there is insufficient current to light the LED flash 12 for a camera exposure.

FIG. 2 also shows a first current path 57, which is created when switching devices 21, 22 are closed (e.g., active) and switching devices 23, 24 are open (e.g., inactive). This performs a charging operation. A second current path 58 is also shown, which is created when switching devices 23, 24 are closed (e.g., active) and switching devices 21, 22 are open (e.g., inactive). This performs a load (e.g., LED flash) driving operation.

Furthermore, FIG. 2 shows locations 26-1, 26-2, 26-3, and 26-4 where a load such as LED flash 12 might be placed. The location 26-1 is anywhere between the power supply (e.g., output of the buck converter 10) to a first terminal for the switching device 23. Location 26-2 is anywhere between a second terminal of the switching device 23 and a first terminal of the charge storage component 25. Location 26-3 is anywhere between a second terminal of the charge storage component 25 and a first terminal of the switching device 24. Location 26-4 is anywhere between a second terminal of the switching device 24 and the fourth node (e.g., a terminal connected to ground). FIG. 2 additionally shows contacts 28 that are configured to be coupled to a load. For instance, contacts 28-1 and 28-2 for location 26-1 might be coupled to multiple LED flashes 12-1 and 12-2 configured in a parallel arrangement. The contacts 28 are any conductive contact suitable for coupling to a load, such as the following: vias in a printed circuit board; traces on a printed circuit board or integrated circuit; pads on a printed circuit board (e.g., for surface mount or for a ball in a ball grid array); pogo-pin contacts (spring contacts); and contacts formed using anisotropic conductive film (ACF) bonding, hotbar bonding, laser welding, normal reflow soldering, and the like. Additionally, ultrasonic welding can considered as another option, e.g., when plastics include some amount of conductive metals/materials in the plastic. Typically, a set 28-1, 28-2 of contacts is used, but there could also be a single contact (see contact 28-1 for location 26-4, where the output of the LED is coupled to ground, e.g., via a wire).

In FIG. 2, a first leg of the circuit occurs between the first and second nodes. A second leg of the circuit occurs between the first and third nodes. A third leg of the circuit occurs between the second and fourth nodes, and a fourth leg of the circuit occurs between the third and fourth nodes.

Figure 3A:
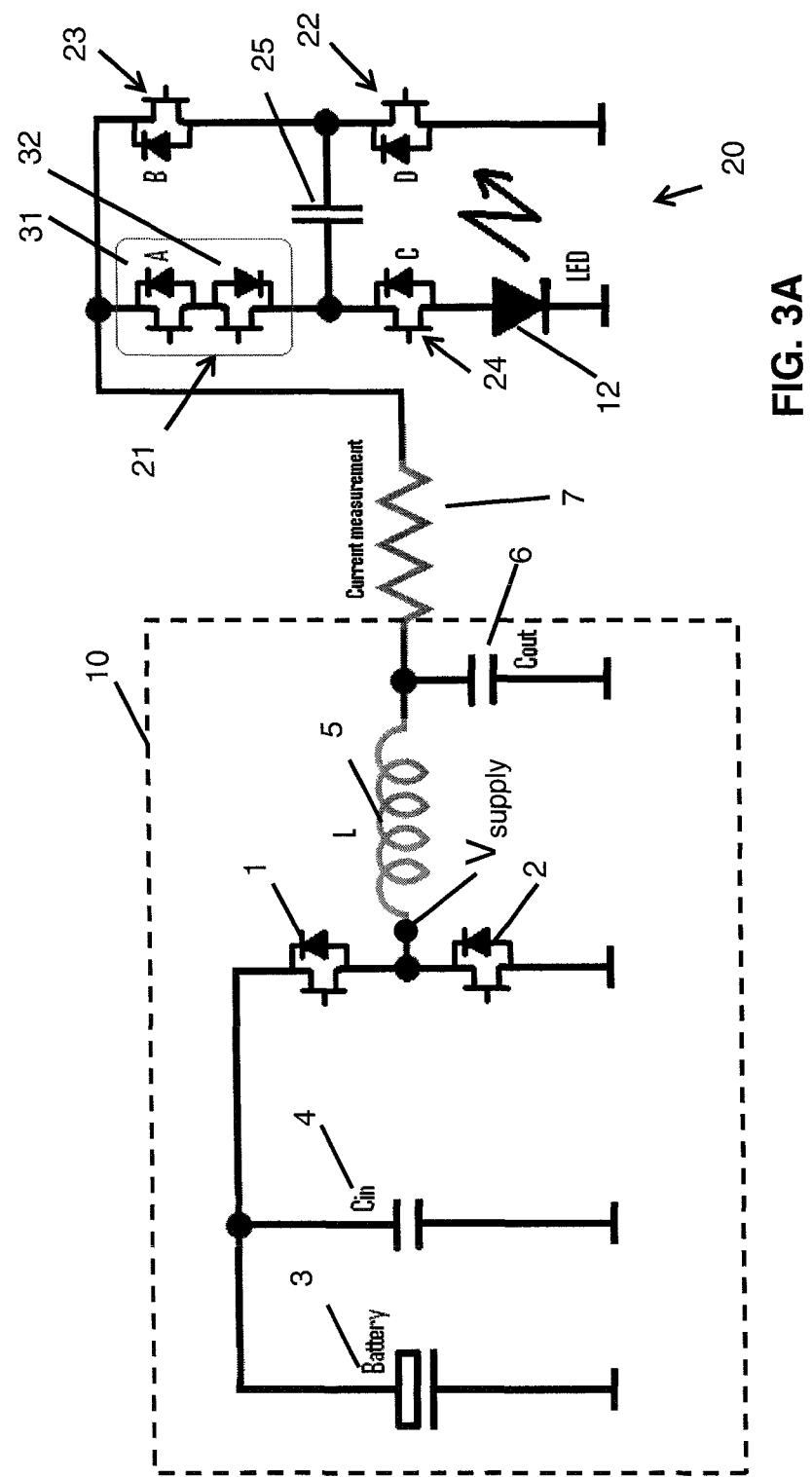
FIG. 3A illustrates a buck converter as a partial driver of the circuit of FIG. 2 according to an example embodiment of the invention.

FIG. 3A illustrates a buck converter as a partial driver of the circuit of FIG. 2 according to an example embodiment of the invention. The buck converter 10 here has a similar operation as aforementioned. Under the assistance of the buck converter 10, a single EDLC cell supercapacitor (as charge storage component 25) having maximum 2.7V tolerance is a suitable energy reservoir for providing burst power to light up the LED flash load 12 having forward voltage in excess of 3.5V.

FIG. 3B is a table indicating how a processor would configure the switching devices in FIG. 3A in order to perform certain operations. As shown in FIG. 3B, for a charge operation, a processor would activate (e.g., close) switching devices A (21) and D (22) while inactivating (e.g., opening) switching devices B (23) and C (24). For a load driving operation, the processor would activate (e.g., close) switching devices B (23) and C (24) while inactivating (e.g., opening) switching devices A (21) and D (22). It is noted that the load driving operation is also a discharging operation for the charge storage component 25.

It is noted that the buck converter 10 is typically operating at, e.g., 4 MHz (megahertz) frequency. The supercapacitor charge and discharge frequency is significantly less, typically 300 Hz in frequency. The processor (e.g., a buck controller) sets values for current and voltage, which change the driver operating point. The processor also dictates the operating frequencies of the buck converter 10 and the charge and discharge frequency for the charge storage component. That is, a controller (e.g., a "processor") is certainly used to control, e.g., PWM frequencies, current and voltage setting based on an operating point, the starting time of feeding current to LED, or flashing, etc. There are basically two PWMs, where one has 4 MHz for SMPS switches control and the other around 300 Hz for dimming or assist light control. It takes time, e.g., 5 ms to fully charge the supercapacitor. After that, all the switches about the supercapacitor are inactive until the flashing (or other) operation is triggered.

Figure 4:
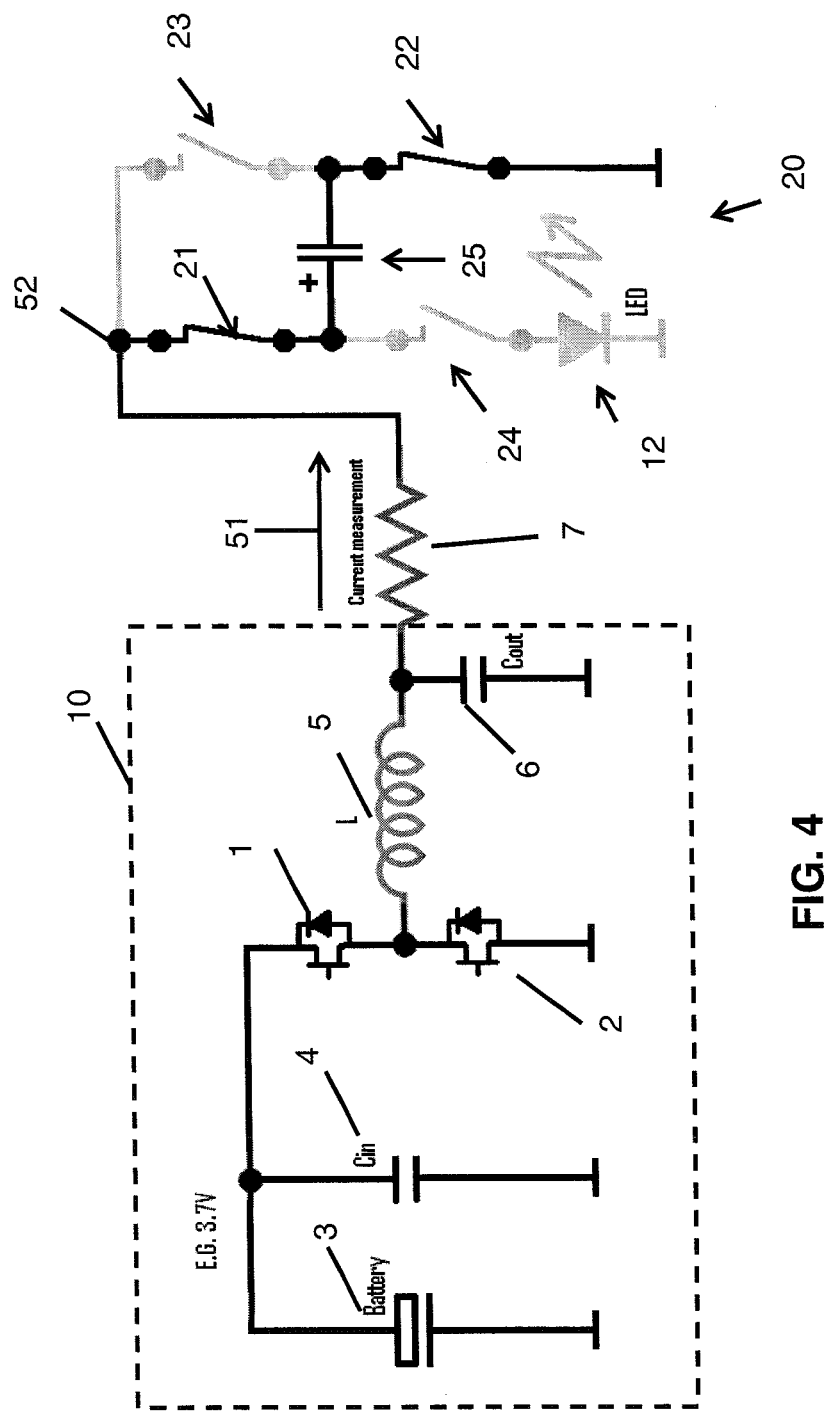
FIG. 4 illustrates the current flow from the circuitry of FIG. 2 to charge a charge storage device according to a charge operation, in accordance with an exemplary embodiment.
Figure 5:
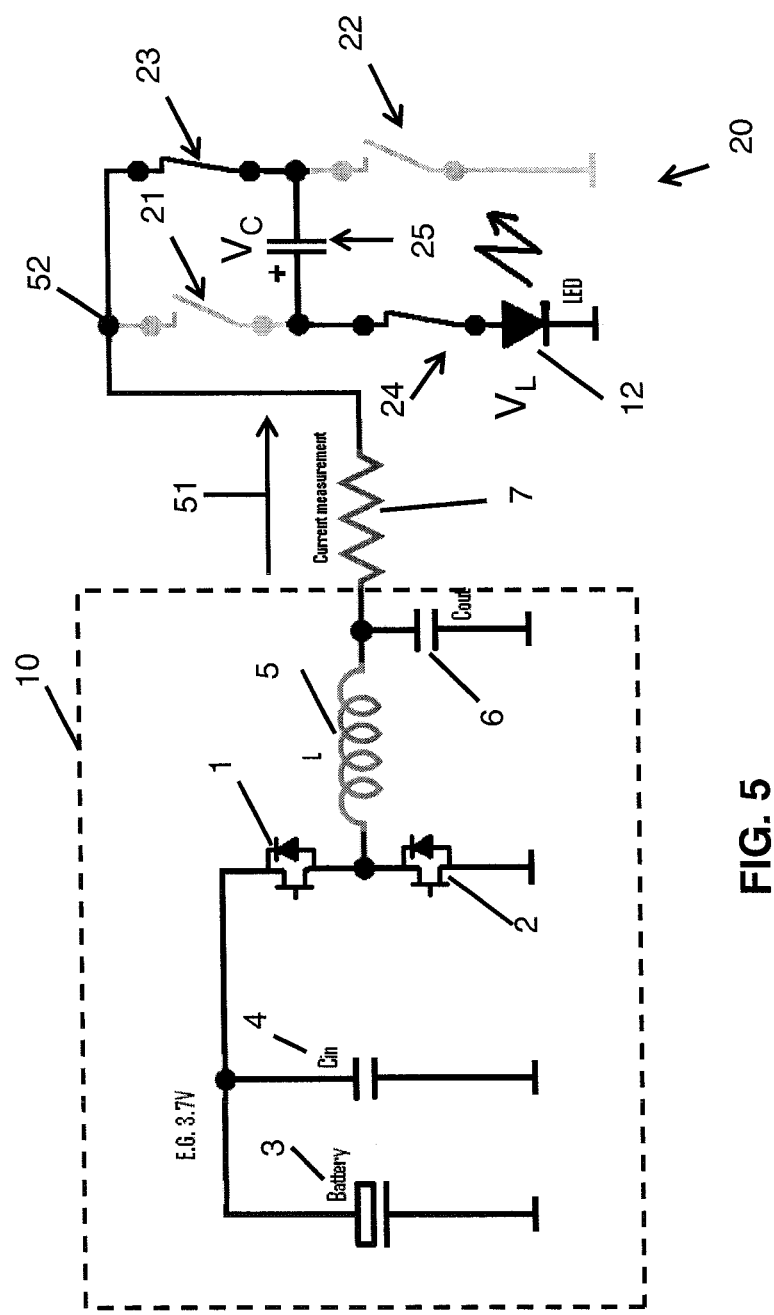
FIG. 5 illustrates a capacitor discharge providing current and voltage from the charge storage device of FIGS. 2 and 3 to a load according to a load driving operation, in accordance with an exemplary embodiment.

In an example embodiment, the charging and discharging operation of a single cell supercapacitor (as charge storage device 25) under the assistance of a buck converter 10 is illustrated in FIGS. 4 and 5 respectively. In the charging operation illustrated in FIG. 4, the switching devices 21 and 22 are active (e.g., closed and conducting) and forming a current path 51 from the buck converter 10 to and through the single cell supercapacitor as charge storage device 25. The charge current through path 51 is typically much less than the discharge current. No current path exists to the load 12 (an LED flash in this example), as switching devices 23 and 24 are inactive (e.g., open and not conducting). The battery 3 is a lithium type battery and $V_{bat}$ is equal to 3.7 V. The voltage is stepped down (in this example) to 2.5 V at the output of the buck converter 10, i.e. $V_{supply}$=2.5 V at reference 52. The charging path continues conducting until the single cell supercapacitor (as charge storage device 25) is fully charged, i.e., the single cell supercapacitor voltage reaches 2.5 V. The charging time is determined by the resistance (not shown) and the supercapacitor (as charge storing device 25), which together form an RC (resistor-capacitor) charging circuit. Resistor 7 gives a feedback to the buck control loop. Charge current from the buck converter 10 has to be low in order to keep power taken from battery 3 to a reasonable level such that the battery noise is kept low.

During discharging (a load driving operation) as illustrated in FIG. 5, the switching devices 23 and 24 are conducting and forming a discharge current path from the single cell supercapacitor as charge storage component 25 to the load 12 (an LED flash in this example). The voltage over the switching device 21 (from reference 52 to the input of the load 12) is negative. If a FET is used as the switching device 21, it is necessary to disconnect the FET body diode effect, for example by using two FETs 31, 32 in series as shown in FIG. 3A. That is, if there was only FET 31 and this FET was inactive (open, not conducting), the inherent diode in the FET 31 would allow current to flow back to node 1 (e.g., at point 52). By putting two FETS 31 and 32 in series, the inherent diode in the FET 32 prevents current from flowing through the switching device 21. The two FETs 31, 32 are configured in reverse polarity to open completely the switching device 21. No current path exists between the power source (buck converter 10) and the single cell supercapacitor as the charge storage component 25, as switching devices 21 and 22 are inactive (open, not conducting). As the single cell supercapacitor (as charge storage component 25) has been fully charged to 2.5V before the single cell supercapacitor is disconnected from the buck converter 10, the voltage over the single cell supercapacitor maintains 2.5V until the supercapacitor is discharged. Obviously, 2.5V over the single cell supercapacitor as charge storage component 25 is not enough to drive an LED flash (as load 12) with its forward voltage of 3.5V. An extra at least 1.0V at the output of the buck converter 10 is needed in assistance to the single cell supercapacitor to provide burst power to the load 12. In this situation, the positive polarity (+) of the supercapacitor is clamped to the 3.5V of the load 12, which is the forward voltage of the LED. The negative polarity of the supercapacitor is forced to 2.5V lower than the forward voltage, in typical case around 1V to ground. The output of the buck converter 10 $V_{supply}$ is knocked down with the supercapacitor. Assuming the LED current is equal to 3 A (three amps), the power consumption of the buck converter 10 is three Watts, which is much lower than using a boost converter or a buck converter without the charge storage component 25 in a conventional circuit. The LED power is 3.5V multiplied by 3 A, or 10.5 watts. With the same battery power $V_{bat}$, it is possible now to use even higher battery power for a higher load current. During charging-discharging, only one of the pair of switching devices 21 and 22 or the pair of switching devices 23 and 24 is in an exemplary embodiment active at any one time to reduce potential for malfunctions. Typically, there would be some "dead time" between activating (e.g., opening) switching devices 21 and 22 and inactivating (e.g., closing) switching devices 23 and 24. There would also typically be dead time between activating (e.g., opening) switching devices 22 and 24 and inactivating (e.g., closing) switching devices 21 and 22.

In this example embodiment, the single cell supercapacitor as charge storage device 25 is not able to drive more than two LED flashes with a forward voltage of 3.5V in series under the assistance from a buck converter with a power source of a 3.7V lithium battery. In another example embodiment, multiple LED flashes in parallel (as shown in FIG. 2) may replace the single LED flash as load 12. That way, all the parallel LED flashes as a load 12 share the same driving voltage but the current fed into each of LED flashes will be divided among all the LED flashes. A current balancing will typically be needed when driving multiple parallel flash LEDs. For example, series resistors could be included with each of the parallel LEDs for monitoring and balancing each individual LED currents. Another feasible way to compensate the current deduction in the parallel LEDs topology is to use some kind of control loop or forward voltage ($V_f$) selected LEDs. LEDs are current driven devices and their light output is proportional to their forward current. In an exemplary embodiment, the regulating current may be a current source to drive the LED with a defined current so a constant current is fed into the LED's load without change by the voltage drop across the switching devices 23, 24. The current source is also beneficial to increase the current fed into each of the parallel LEDs.

In another example embodiment, the switching devices 21 and 22 could comprise resistors but this would generate condition limitations, for example charging time would have to be much longer than discharging, and the power flash period is longer than if, e.g., FET switching devices 21, 22 are used.

Figure 6:
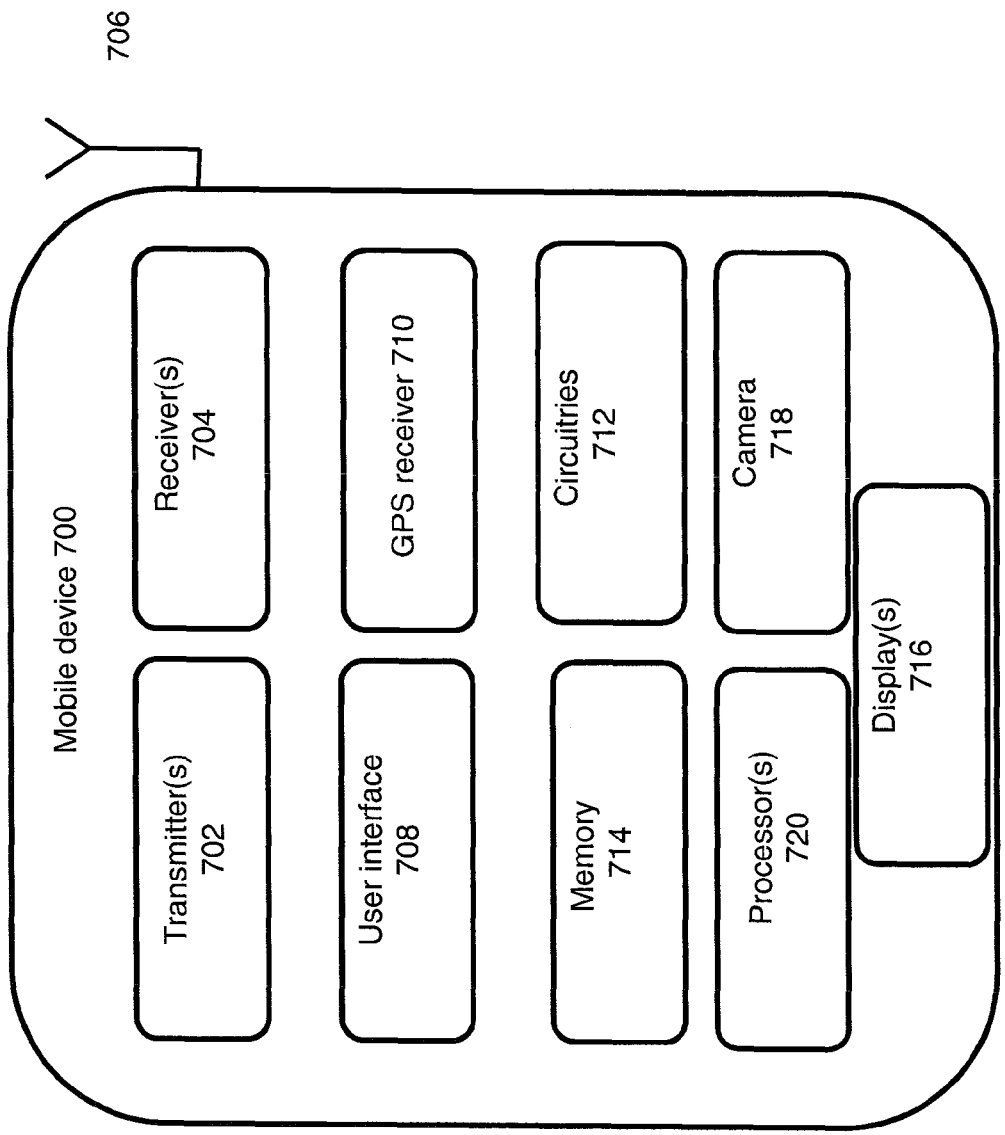
FIG. 6 illustrates a mobile device according to an example embodiment of the invention.

FIG. 6 illustrates an example embodiment of a mobile device. A mobile device 700 comprises one or more transmitters 702 and receivers 704 for transmitting and receiving data. In some embodiments, the mobile device 700 comprises one or more antenna 706 serving the purpose of transmitting and receiving data. The mobile device 700 may further comprise a user interface 708, including but not limited to a graphical user interface. The mobile device 700 may further comprise one or more elements for the determination of location or velocity of motion, including but not limited to a GPS (global positioning system) receiver 710 and the GPS circuit in circuitries 712. The mobile device 700 may further comprise one or more memories 714 for data and application storage and some other functional elements, for example, a camera 718, one or more displays 716 for monitoring through the camera 718 and display the screen of the mobile device 700. The camera 718 has (in this example) a built-in LED providing, e.g., a flash, movie, or torch lighting operation under the control of one or more processors 720. The more or more processors 720 execute instructions including but not limited to the energy management for driving the LED device for flashing operation. The circuitries 712 may further comprise display circuitry, camera circuitry, and/or audio circuitry.

Regarding flash, movie, or torch lighting operations, these are functions of how the LED is controlled. Usually a flash pulse is very short duration, for example 66 ms (milliseconds) and high current. A movie operation can be referred to as assist light or video light or movie light. The current is significantly less than with a flash pulse. The duration, however, is much longer than with flash pulse. One might think that movie light/assist light/video light can be even continuous to certain extent. The torch operation is used, e.g., when user wants to find his or her keys or keyhole. It is a very convenient feature. The current and pulse duration can be considered similar to video light. In all of these cases, the current can be either constant current or pulse width modulated (PWM) current. In general, flash current is much higher than torch or video light (typically 3000 mA for a flash operation vs. 60 mA-200 mA for a video or torch operations). How to handle the lower current level depends a lot on LED forward voltage and buck input voltage. With low LED current, forward voltage may be too low (3.0V or less) and constant current operation may not be possible, but this depends on circuit design. In constant current mode (switches 21 and 24 active in FIG. 3, while switches 22 and 23 are inactive) LED current is again controlled by the buck converter 10.

If PWM is needed, operation is like flash but charge and discharge periods have to be shorter to avoid light blinking. Further, charge and discharge currents are typically much lower than in flash operation if the circuits operate with PWM. As noted above, the PWM frequency is typically 300 Hertz as one example. Again, all currents are controlled by the buck converter 10. That is, the LED current is controlled by a current controller. The current controller may be implemented in the SMPS or charge pump. The current may be controlled by adjusting PWM signal frequency, e.g., for dimming.

Without in any way limiting the scope, interpretation, or application of the claims appearing below, a technical effect of one or more of the example embodiments disclosed herein is reduced complexity of a power regulator circuit and higher efficiency in system point of view for the whole battery range. Another technical effect of one or more of the example embodiments disclosed herein is to reduce the output voltage of power regulator during flashing operation by using buck topology such that the power consumption of the power regulator is reduced. A third technical effect of one or more of the example embodiments disclosed herein is to reduce the capacity and volume of the storage device under the assistance of a buck converter when driving high power LEDs. Further the proposed topology provides a safer use of battery because peak current of delivery directly from the energy source is smaller, and the efficiency is better as less heat is generated inside the driver, which means the driver is even capable of driving more current to the LED.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications, which may be made without departing from the scope of the present invention as defined in the appended claims.

What is claimed is:

1. An apparatus, comprising:
a first node configured to be coupled to a power supply;
a charge storage component coupled between a second node and a third node, wherein the charge storage component stores a charge during a charging operation and releases the stored charge during a power application operation;
a first leg between the first node and second node, the first leg comprising a first switching device;
a second leg between the first node and the third node, the second leg comprising a second switching device;
a third leg between the second node and a fourth node, the third leg comprising a third switching device;
a fourth leg between the third node and the fourth node, the fourth leg comprising a fourth switching device;
a load comprising a light emitting diode, having an input node and an output node, and being located in a selected one of the second leg or third leg, wherein location of the load in the selected leg causes current from the selected leg to pass through the input node of the load, through the load, through the output node of the load, and back into the selected leg,
whereby during the charging operation closing the first and fourth switching devices and opening the second and third switching devices cause the charge storage component to be charged via the first and fourth legs by the power supply, and during the power application operation closing the second and third switching devices and opening the first and fourth switching devices cause the load to be driven via a corresponding one of the second leg or third leg by the power supply and the charge storage component so that during the power application operation stored charge in the charge storage component stored during the charging operation is applied as a direct current voltage through the light emitting diode to generate a light output as a pulse of light having a duration and intensity dependent on the stored charge.

2. The apparatus of claim 1, wherein the charge storage component comprises a single-cell capacitor.

3. The apparatus of claim 1, wherein the fourth node is connected to ground.

4. The apparatus of claim 1, wherein the load comprises multiple light emitting diodes connected together in parallel.

5. The apparatus of claim 1, wherein the apparatus is formed on an integrated circuit.

6. The apparatus of claim 1, wherein the apparatus further comprises the load and the power supply and wherein the apparatus comprises a mobile device.

7. The apparatus of claim 1, wherein each of the first, second, third, and fourth switching devices comprise at least one of the following: a bipolar transistor; a field effect transistor; a junction field effect transistor; or a metal oxide semiconductor field effect transistor.

8. The apparatus of claim 1, further comprising the power supply, where the power supply comprises a step-down direct-current to direct-current power supply.

9. The apparatus of claim 1, wherein a first terminal of the second switching device is coupled to the first node and a second terminal of the second switching device is coupled to the third node, wherein the load is located between the first node and the first terminal of the second switching device.

10. The apparatus of claim 1, wherein a first terminal of the second switching device is coupled to the first node and a second terminal of the second switching device is coupled to the third node, wherein the load is located between the second terminal of the second switching device and the third node.

11. The apparatus of claim 1, wherein a first terminal of the third switching device is coupled to the second node and a second terminal of the third switching device is coupled to the fourth node, wherein the load is located between the second node and the first terminal of the third switching device.

12. The apparatus of claim 1, wherein a first terminal of the third switching device is coupled to the second node and a second terminal of the third switching device is coupled to the fourth node, wherein the load is located between the second terminal of the third switching device and the fourth node.

13. The apparatus of claim 1, wherein the power supply comprises a buck converter and the apparatus further comprises the buck converter, wherein the buck converter is coupled to the first node.

14. The apparatus of claim 13, further comprising at least one processor configured to close the first and fourth switching devices and to open the second and third switching devices to cause the charge storage component to be charged via the first and fourth legs by the power supply, and to close the second and third switching devices and to open the first and fourth switching devices to cause the load to be driven via a corresponding one of the second leg or third leg by the power supply and the charge storage component.

15. The apparatus of claim 14, wherein when the second and third switching devices are closed and the first and fourth switching devices are opened, an output voltage of the charge storage component is less than a voltage required to drive one or more light emitting diodes as the load and an output of the buck converter assists the output voltage of the charge storage device to provide at least enough power to drive the load.

\* \* \* \* \*